April 23, 1968  D. B. GERSHBERG  3,379,573
FLUORINATED POLYMER MATRIX WITH FLUORINATED
SURFACTANT AND FUEL CELL THEREWITH
Filed May 6, 1965
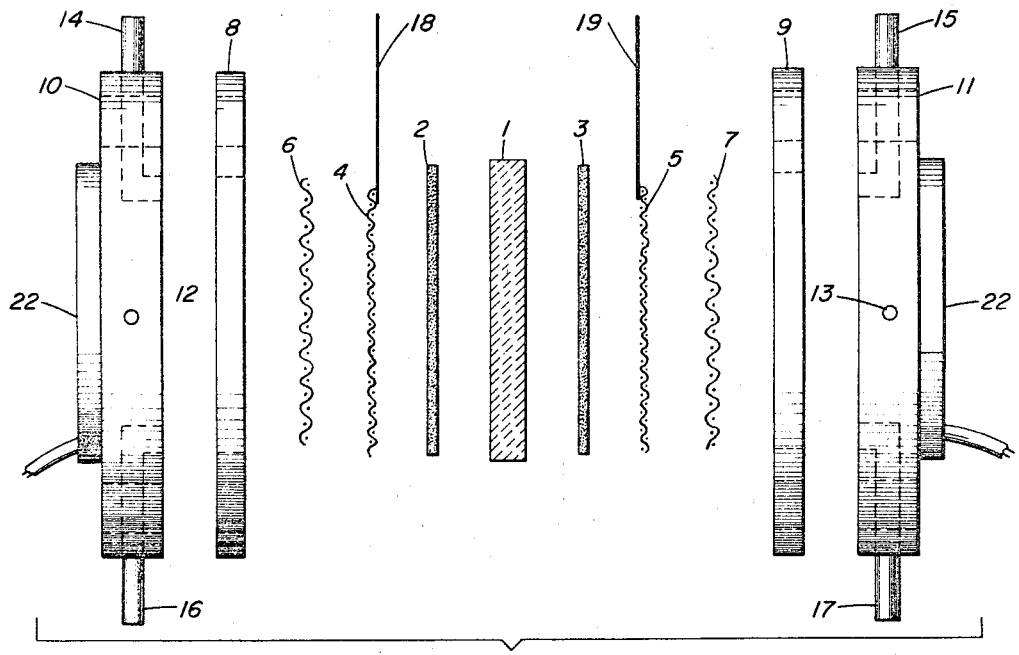
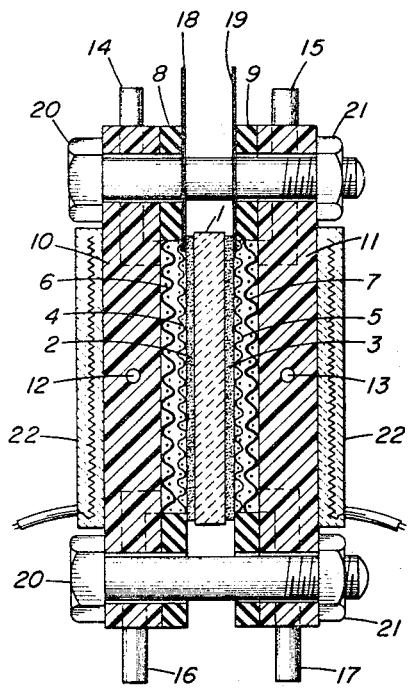
INVENTOR.
DAVID BENEDICT GERSHBERG
BY
ATTORNEY

3,379,573
FLUORINATED POLYMER MATRIX WITH FLUORINATED SURFACTANT AND FUEL CELL THEREWITH
David Benedict Gershberg, Stamford, Conn., assignor to American Cyanamid Company, Stamford, Conn., a corporation of Maine
Filed May 6, 1965, Ser. No. 453,772
16 Claims. (Cl. 136—86)

ABSTRACT OF THE DISCLOSURE

A porous polytetrafluoroethylene or polytrifluoromonochloroethylene matrix material saturated with an aqueous inorganic electrolyte containing a small amount of a water-soluble salt of a highly fluorinated aliphatic surfactant which may be between water-proofed electrodes in a fuel cell.

---

The present invention relates to novel electrolyte-wettable, porous and felting materials eminently suitable for use as matrices in typical fuel cells. More particularly, it relates to electrolyte-wettable, polyhalogenated ethylene polymer porous and felt materials and to processes for their preparation. Still more particularly, the invention is concerned with electrolyte-wettable, polyhalogenated ethylene polymers admixed with highly fluorinated aliphatic surfactants and to their utilization as fuel cell matrices.

As is known, several different types of matrices have been used for fuel cell applications. Most common of the matrices is asbestos for alkaline electrolyte fuel cells and glass fiber paper for acid electrolyte fuel cells. These materials generally retain sufficient quantities of electrolyte to permite a fuel cell to operate even at temperatures up to about 100° C. However, each suffers from a serious drawback in that they fail to operate at desirable constant high power output over sustained periods of time at temperatures of at least 100° C. and higher. If matrices are employed which can withstand elevated temperatures, such as commercially-available polytetrafluoroethylene porous sheet or felting or polytrifluoromonochloroethylene sheets, it is found that these too cannot and do not function under rigid conditions of elevated temperature and extended times. If the latter materials could be modified so as to operate as matrices, a long-felt need would be satisfied.

Toward this end, it has been found that polyhalogenated ethylene polymer felt or sheet can be sufficiently wetted by contacting the polymer with small but effective amounts of a highly fluorinated aliphatic compound as a surfactant admixed with either an acidic or basic electrolyte for use in a fuel cell. Surprisingly, the aforementioned class of surfactants does not wet the polymeric matric to the extent that they flood the electrodes positioned adjacent to the matrix. Thus, the flooding out of the water-sensitive electrodes during operation of a fuel cell is prevented.

In general, any polyhalogenated ethylene polymer may be used. It may be untreated or, if desired, the polymer's surface may be alkali-etched. Illustrative polymeric materials are: polytetrafluoroethylene, known as "Teflon," and polytrifluoromonochloroethylene. Each may be obtained commercially in the form of a porous sheet. "Teflon," for instance, may also be obtained as a felt comprising matted fibers loosely and randomly oriented. However, in each form they are substantially hydrophobic and cannot retain sufficient electrolyte for sustained fuel cell operations at elevated temperatures, usually at 100° C., or higher. Exemplary electrolytes most frequently employed are: potassium hydroxide, sulfuric acid and phosphoric acid.

In the practice of the present invention there is added to the electrolyte from about 0.001% to about 1.0% of a surfactant, based on the weight of the electrolyte, said surfactant being a water-soluble salt of highly fluorinated aliphatic compound containing from 6 to 18 carbon atoms. Exemplary fluorosurfactant additives are (I) the ammonium, potassium, or sodium salt of a completely fluorinated aliphatic monocarboxylic acid, such as (A) caprylic acid, (B) caproic acid, (C) octanoic acid, (D) n-nonic acid, (E) decanoic acid, (F) lauric acid, (G) myristic acid, (H) tridecanoic acid, and mixtures thereof, and (II) a perfluoroalkyl sulfonate, such as ammonium perfluorononyl sulfonate.

Substantial retention of electrolyte by untreated "Teflon" or polytrifluoromonochloroethylene structures is observed in the presence of the aforementioned halogenated surfactant additives. Usually, as much as 300%, or more, of electrolyte above that is normally retained is effected. Thus, resultant electrolyte-wetted polyhalogenated ethylene polymer is rendered serviceable as a matrix. In the absence of the electrolyte surfactant additive, retention of electrolyte on the polymer is substantially negligible. The electrolyte-wetted polyhalogenated ethylene polymer of the present invention can thus be employed as an effective matrix in a fuel cell operated at temperatures in the range from about 100° C. to about 250° C. and having sustained power output over a prolonged time period.

In a typical practice of the invention, a matrix fuel cell which contains electrolyte as a liquid is provided. The latter is necessarily located in a porous matrix as hereinabove described and sandwiched between two porous, catalytic electrodes. Frequently, the cell comprising the electrode-matrix sandwich is held together by providing the sandwich with external metal face plates which serves also to distribute incoming gaseous fuel and oxidant, respectively, over their respective electrodes and to carry the issuing current. Metal screens which operate the electrodes and face plates can provide sufficient spacing for the flow of reactant gases over the electrodes and can also serve as current collectors. Inert gaskets, such as fabricated silicone rubber, betwen adjacent edges of the face plates prevent the leakage of gases and electrolyte. When the cell is assembled, a portion of the electrolyte is unavoidably squeezed into the pores of the electrode.

The porous electrodes are usually flat and contain a catalyst, such as platinum or silver, which promotes the cell reaction. The latter electrochemical reaction which takes place depends on the formation of a three phase interface involving a solid electrode, liquid electrolyte and gaseous reactant. This interface is attained by partially water-proofing the electrode with normally hydrophobic materials, such as "Teflon". This prevents complete penetration or flooding of the pores by the selected electrolyte.

Suprisingly, the halogenated surfactant added to the electrolyte mixture as employed herein is principally adsorbed by the polymeric matrix substance and does not adversely affect contiguous electrode structures. It is noted that the small amounts of surfactant are sufficient to reduce cell resistance to a satisfactory level without simultaneously wetting abutting electrodes, thereby avoiding the in operativeness of the cell which occurs during electrode flooding. The small, but effective amount of surfactant is less than about 2% and usually does not exceed about 1.0%, based on the weight of the electrolyte added.

In general, fuel cells hereinbelow defined and which fall within the purview of the present invention comprise three essential elements: electrolyte, electrodes or electrocatalysts, and current collectors. Suitable collectors can be perforated, or corrugated plates or metallic screens and equivalents thereof.

In order to further clarify the invention, these and other embodiments thereof are shown in the accompanying drawing and will be described in detail in conjunction with said drawing.

In the drawings:

FIGURE 1 is an exploded plan view, partially in section, of a fuel cell employing the matrix of the present invention, and FIGURE 2 is a partially expanded side view, partially in section, of the fuel cell of FIGURE 1.

In FIGURE 1, matrix 1 of the present invention is positioned between a fuel electrode 2, such as platinum, and an oxygen electrode 3, such as platinum, palladium or silver. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These gaskets seal as well as separate the chambers containing reactants. Exterior to the gaskets are housing members 10 and 11 to which are attached thermocouple 12 and heat control probe 13 and having inlet stainless steel or other inert metal tubing 14 and 15 through which hydrogen and oxygen are separately introduced into the fuel cell. Nickel tubing 16 and 17 are provided as vents for unused gases. Wire leads 18 and 19, connected to current collector screens 4 and 5, are the conductive members through which current flows from and to the fuel cell through the external circuit when the fuel cell is in operation. The cell, secured by means of bolts 20 and nuts 21 as shown in FIGURE 2, can be heated, if desired, by, for instance, an external electrical heating pad 22. The temperature of the cell, determined by the thermocouple 12, is controlled by heat control probe 13.

Matrixes are illustratively prepared in the following examples and are not to be taken as limitative of the invention. Further, the performance of each matrix incorporated in a fuel cell as described above is presented.

Example 1

To a 5 N aqueous potassium hydroxide electrolyte solution is added 0.01% of ammonium perfluorocaprylate. "Teflon" felt of 20 mils thickness is immersed in the latter solution. The felt material absorbs 0.51 milliliters of solution per square inch. However, at an electrolyte adsorption of 0.31 milliliters per square inch, the wet felt is employed as a matrix in a matrix fuel cell described above and operating at 70° C. on hydrogen as the fuel and oxygen as the oxidant. The active area of the cell is five square centimeters. The cell resistance is 0.076 ohm and good performance is obtained at current densities between 100 and 400 millimperes per square centimeter. Finally, the cell is run for 110 hours while maintaining a power output of between 0.085 and 0.082 watt per square centimeter.

Similar results are obtained when employing either potassium perfluorocaprylate or sodium perfluorooctanate as the surfactant in lieu of ammonium perfluorocaprylate.

Example 2

The procedure of Example 1 is followed in every material respect except that no surfactant or halogenated wetting agent is added to the electrolyte. The maximum absorption of electrolyte is only 0.14 ml./in.$^2$. A high cell resistance of 17 ohms is noted. Thus, performance of the cell is nil.

Example 3

Repeating the procedure of Example 1 in every detail except that the potassium hydroxide concentration is 13 N rather than 5 N and the cell is operated at 100° C. rather than at 70° C. The cell resiseance is 0.065 ohm and good performance is obtained at current densities of from 100 to 200 milliamperes per square centimeter. The cell is operated for 85 hours while maintaining a power output of from 0.088 to 0.084 watt per square centimeter.

Similar good performance is observed when employing polytrifluorochloroethylene porous sheeting in lieu of the "Teflon" felting and ammonium perfluorononyl sulfonate is used in place of ammonium perfluorocaprylate.

Example 4

The procedure of Example 3 is repeated except that no surfactant or wetting agent is added to the electrolyte solution. A relatively high cell resistance amounting to 3 ohms is noted and no performance at a current density of 100 milliamperes per square centimeter is obtained.

I claim:

1. A matrix fuel cell which comprises in combination: a matrix member consisting essentially of an electrolyte-wetted, porous material selected from the class consisting of polytetrafluoroethylene and polytrifluoromonochloroethylene saturated with an aqueous inorganic electrolyte containing from about 0.001% to about 1% of a substantially water-soluble salt of a highly fluorinated aliphatic surfactant of from 6 to 18 carbon atoms and based on the weight of said electrolyte, and water-proofed catalytic electrodes abutting said matrix member.

2. The fuel cell of claim 1 wherein the matrix member is polytetrafluoroethylene felting.

3. The fuel cell of claim 1 wherein the matrix member is polytrifluoromonochloroethylene sheeting.

4. The fuel cell of claim 1 wherein the surfactant is ammonium perfluorocaprylate.

5. The fuel cell of claim 1 wherein the surfactant is ammonium perfluorononyl sulfonate.

6. The fuel cell of claim 1 wherein the surfactant is potassium perfluorocaprylate.

7. The fuel cell of claim 1 wherein the electrolyte is 5 N potassium hydroxide.

8. The fuel cell of claim 1 wherein the electrolyte is 13 N potassium hydroxide.

9. An improved electrolyte-wettable, porous matrix, said matrix consisting essentially of a material selected from the class consisting of polytetrafluoroethylene and polytrifluoromonochloroethylene saturated with an aqueous inorganic electrolyte containing from about 0.001% to about 1% of a substantially water-soluble salt of a fluorinated aliphatic surfactant of from 6 to 18 carbon atoms and based on the weight of said electrolyte.

10. The matrix of claim 9 wherein the treated matrix member is polytetrafluoroethylene felting.

11. The matrix of claim 9 wherein the treated matrix member is polytrifluoromonochloroethylene porous sheeting.

12. The matrix of claim 9 wherein the surfactant is ammonium perfluorocaprylate.

13. The matrix of claim 9 wherein the surfactant is ammonium perfluorononyl sulfonate.

14. The matrix of claim 9 wherein the surfactant is potassium perfluorocaprylate.

15. The matrix of claim 9 wherein the electrolyte is 5 N potassium hydroxide.

16. The matrix of claim 9 wherein the electrolyte is 13 N potassium hydroxide.

References Cited

UNITED STATES PATENTS

| | | |
|---|---|---|
| 2,392,389 | 1/1946 | Joyce. |
| 2,573,639 | 10/1951 | Coler. |
| 2,676,929 | 4/1954 | Duddy _____ 136—146 X |
| 3,202,733 | 8/1965 | Strauss _____ 136—146 X |
| 3,258,364 | 6/1966 | Worsham et al. _____ 136—86 |
| 3,265,536 | 8/1966 | Miller et al. _____ 136—86 |
| 3,281,274 | 10/1966 | Moerikofer _____ 136—86 |

WINSTON A. DOUGLAS, *Primary Examiner.*

D. L. WALTON, *Assistant Examiner.*